UNITED STATES PATENT OFFICE.

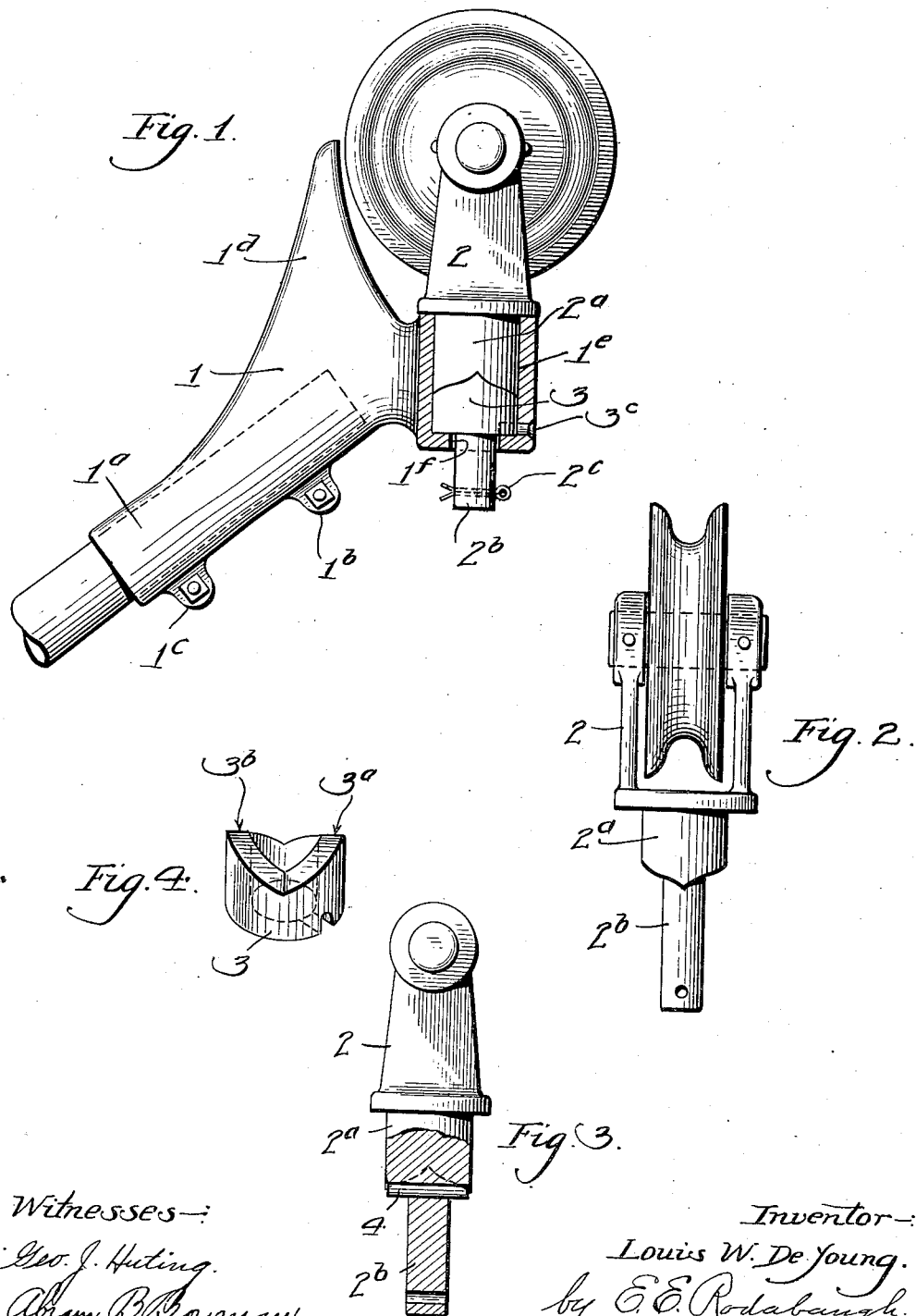

LOUIS W. DE YOUNG, OF LEBEC, CALIFORNIA.

TROLLEY-WHEEL SUPPORT.

1,087,221. Specification of Letters Patent. Patented Feb. 17, 1914.

Application filed June 15, 1912. Serial No. 703,815.

*To all whom it may concern:*

Be it known that I, LOUIS W. DE YOUNG, a citizen of the United States, and a resident of Lebec, in the county of Kern, in the State of California, have invented certain new and useful Improvements in Trolley-Wheel Supports, of which the following is a specification.

My invention relates to supports for trolley wheels for electric railway cars, and the objects of my invention are, first, to provide a trolley wheel support in which the wheel is pivotally mounted for lateral movement on its support, whereby the same will readily follow the trolley wire in traveling around curves and passing over switches, second, to provide such a support that the wheel will be normally in line for traveling along a straight wire, third, to provide such a support in which springs, which are liable to get out of order, are eliminated, and fourth, to provide such a support that is simple of construction, durable and easily installed.

With these and other objects in view as will appear, my invention consists of certain novel features of construction, combination and arrangement of parts as will be hereinafter described in detail and particularly set forth in the appended claims,—reference being had to the accompanying drawings and to the characters of reference thereon, which form a part of this specification, in which—

Figure 1 is a side elevational view of my support with the wheel mounted thereon, showing a portion broken away and in section, Fig. 2 is a front elevational view of the harp of my support with the wheel mounted therein. Fig. 3 is a side elevational view of the harp without the wheel, shown in a slightly modified form, and Fig. 4 is a perspective view in detail of the bearing upon which the harp rides.

Similar characters of reference refer to similar parts throughout the several views.

The shank piece 1, harp 2 and bearing 3 constitute the principal parts of my trolley wheel support. The shank piece 1 is provided with a socket $1^a$ adapted to fit tightly onto the upper end of the trolley pole, and it is provided with double lugs $1^b$ and $1^c$, and with a slot between the lug members so that it may be clamped onto the trolley pole. It is provided with an upwardly extending guard portion $1^d$ adapted to guard the wire from catching under the lower surface of the wheel in case the trolley wheel leaves the wire. This shank piece is also provided with another socket $1^e$ at an angle to the socket $1^a$. This socket is adapted to normally hold the harp in a vertical position, and is provided in its lower end with a hole $1^f$. In the bottom of this socket $1^e$ is set the bearing piece 3, which is shaped as shown best in Fig. 4 with two oppositely disposed double beveled surfaces $3^a$ and $3^b$, and it is fastened therein by means of a screw $3^c$. Mounted in this socket on the top of this bearing piece 3 is the journal $2^a$. Its bottom surface is adapted to fit the beveled upper surface of the piece 3 when in the position as shown in Fig. 1; but in case the harp is turned, it will ride upon the bevel surfaces. The trolley pole being provided with a spring at its base will cause an upward thrust of the support at all times, which will allow the trolley in case it leaves the wire to assume its normal position as shown in Fig. 1. Upon the upper end of the journal $2^a$ is the harp which is integral therewith. This harp is suitable for the ordinary trolley wheel which is mounted therein in the usual manner. On the lower end of this journal $2^a$ is provided a reduced extended portion $2^b$ which extends downwardly through the bearing 3 and the hole $1^f$ in the socket $1^e$, and in its lower end is provided a cotter pin $2^c$ which is adapted to prevent the journal $2^a$ from withdrawing from the socket in case the trolley leaves the wire, but it is placed a sufficient distance below the bottom of the socket to allow a free movement of the journal $2^a$ on the bearing 3.

In the modified construction, as shown in Fig. 3, there is added to the lower extended surface of the journal $2^a$, a pin 4 extending through the extended portion $2^b$ which provides a less bearing surface for the journal $2^a$ upon the bearing 3.

Though I have shown and described a particular construction and arrangement of parts, I do not wish to be limited to this particular construction and arrangement, but desire to include in the purview of my invention, the construction and arrangement substantially as set forth in the appended claims.

It is obvious that with this construction, there is provided a support for trolley wheels that is simple and economical of construction; that will hold the trolley wheel normally in line with the trolley wire with a minimum of friction on the wire, and with only a slight pressure upon the wheel in case of curves, and the like, which will cause the journal $2^a$ to ride upon the bearing 3 and allow the harp to turn, but after the curve is passed and the line is straight the wheel will immediately assume its normal position; that the parts may be easily removed in case of wear, and that there are no springs or other parts liable to breakage.

Having thus described my invention, what I claim as new and desire to secure by Letters Patent is:—

1. A trolley wheel support comprising a main shank piece provided with a socket adapted to be fitted over and be rigidly secured on the upward extending end of a trolley pole, provided with an upwardly extending guard piece and also provided with a normally vertical socket portion therein, a bearing with its upper surface beveled to provide two double angles on opposite sides thereof loosely mounted in said latter mentioned socket, means for holding said bearing from turning therein and a trolley harp provided with a downwardly extending journal portion adapted to fit into said socket and its lower surface to conform to the upper angled surface of said bearing piece, provided with a reduced extended portion.

2. A trolley wheel support comprising a main shank piece provided with a socket adapted to fit over and be clamped on the upward extending end of a trolley pole, provided with an upwardly extending guard piece, and also provided with a normally vertical socket portion provided with a hole in the bottom thereof, a bearing with its upper surface beveled to provide two double angles on opposite sides thereof loosely mounted in said latter mentioned socket, means for holding said bearing from turning therein, a trolley harp provided with a downwardly extending journal portion adapted to fit into said socket and its lower surface to conform to the upper angled surface of said bearing piece, provided with a reduced extended portion extending downwardly through said bearing piece and said hole in said socket and a pin to prevent its removal from said socket.

In testimony whereof, I have hereunto subscribed by name in the presence of two subscribing witnesses.

LOUIS W. DE YOUNG.

Witnesses:
EDGAR P. FEES,
CLINTON SHATTUCK.

Copies of this patent may be obtained for five cents each, by addressing the "Commissioner of Patents, Washington, D. C."